July 19, 1966  TETSUO SAITO ETAL  3,261,390
WELDING IRON
Filed Dec. 3, 1964
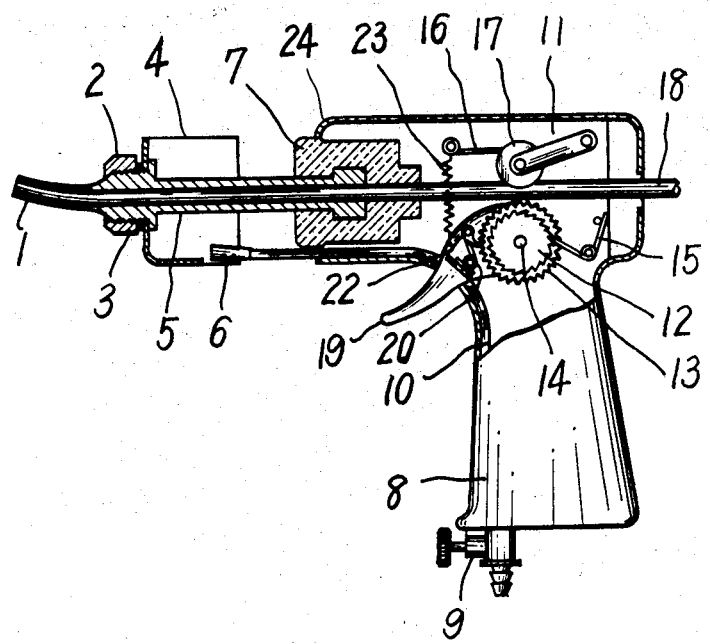
Tetsuo Saito
Tokugoro Mizukami
Masazumi Otake
        INVENTORS
BY Stevens, Davis, Miller & Mosher
        ATTORNEYS 3,261,390
WELDING IRON
Tetsuo Saito, Nerima-ku, Tokyo, and Tokugoro Mizukami and Masazumi Otake, Hitachi, Japan, assignors to Hitachi Wire & Cable Limited, Chiyoda-ku, Tokyo, Japan, a corporation of Japan
Filed Dec. 3, 1964, Ser. No. 415,732
2 Claims. (Cl. 158—26)

The present invention relates to a welding iron comprising a welding rod of synthetic resin which is fed through a heater means towards a nozzle by operating an operating lever.

The object of the present invention is to provide a welding iron in which the tip end thereof is covered in such a manner that heating can be effected from the lower external side of a welding rod with the aid of a heating means such as a burner and that the rear portion of the cover is thermally insulated from the main body by means of heat-insulating materials.

For a better understanding of the invention, reference is taken to the accompanying single drawing which is a sectional view illustrating an embodiment of a welding iron according to the invention.

Referring to the drawing, 1 designates a feeding nozzle which is formed by the tip of a hollow cylindrical portion 5. A half-cup shaped cover 4 is detachably mounted through a washer 3 by means of a nut 2 such that heating can be effected through a burner 6 from the lower external side. The rear portion is thermally insulated from the main body by means of a shaped body 7 of heat-insulating material. The main body is provided with a grip portion 8 having at its lower end a valve for regulating gas 9 and enclosed therein a gas feeding pipe 10.

The main body is formed at its center with a hollow space 11 in which two gears 12 and 13 are driven by a shaft 14, the gear 12 being held by a ratchet 15 made of a leaf spring. On the opposite side of the gear 12 and 13, a pressing roller 17 is mounted with the aid of a leaf spring 16 in such a manner that a welding rod 18 may be held in the space between said roller 17 and the gear 13. Loosely mounted on the shaft 14 is an operating lever 19 to which a ratchet 22 is secured through a spring 20 so that the tip of said ratchet 22 is engaged with the gear 13. A resetting spring is noted by reference numeral 23 and the main housing portion is noted by reference numeral 24. If the operating lever 19 is pulled backwards, the ratchet 22 causes to rotate the gear 13 and feed the welding rod 18 forward through the teeth of the gear 13, the welding rod 18 being held by the cylinder portion 5 of the welding iron. When the welding rod 18 enters into the tip portion of the hollow cylinder 5 where the temperature is raised beyond the melting point (120°–150° C.) of the welding rod 18 due to heat supplied from the lower external side by means of the burner 6, that portion of the welding rod 18 becomes immediately melted. If the nozzle 1 is tilted downwards, the melted synthetic resin is dropped down in a suitable manner.

Accordingly, the amount of the melted resin to be dropped down can be controlled by operating the lever 19. If the finger engaged with the lever 19 is released, the lever 19 and the ratchet 22 are returned to the original positions by the pulling force of the resetting spring 23, whilst the gear 12 remains stationary by the resistance due to the leaf spring 15.

Whenever such operations are repeated, suitable amount of the melted resin is dropped down until the welding is completed.

As above mentioned, the present invention utilizes the cover 4 provided at the tip portion of the hollow cylinder 5 to supply heat from the burner 6 while at the same time preventing the forward ejection of the flame from the burner 6 by the cover 4, which results in that the hollow cylinder 5 can sufficiently be heated. The provision of the thermal insulation between the hollow cylinder 5 and the main body by the heat-insulating material 7 in accordance with the invention prevents heat from conducting into the main body and makes it possible to operate the welding iron in a safe manner. Moreover, the invention renders it possible to drop down a necessary amount of the resins from the tip of the welding rod 18.

What we claim is:
1. A welding iron comprising a main housing portion and a hollow cylinder connected to said main housing portion by heat-insulating means, said hollow cylinder being adapted to guide a weld rod therethrough, a half cup-shaped cover at the exit of said hollow cylinder and connected thereto, a burner within said cover positioned at the underside of said hollow cylinder for supplying heat within said cover from the lower external side of said hollow cylinder.

2. A welding iron comprising a main housing, a hollow cylindrical portion protruding outwardly from one side of said main housing and forming on its free end a nozzle portion, said hollow cylindrical portion being adapted to guide a weld rod therethrough, a half cup-shaped cover portion mounted on said hollow cylinder adjacent the nozzle end thereof, burner means positioned within said cover adjacent the underside of said hollow cylinder for supplying heat to said weld rod, heat insulating means for insulating said hollow cylinder from said main housing.

References Cited by the Applicant
UNITED STATES PATENTS
1,341,497   5/1920   Davies _____ 158–25
2,758,485   6/1956   Sauer _____ 228–53
2,758,192   8/1956   Gustafsson _____ 228–53

JOHN F. CAMPBELL, Primary Examiner.
WHITMORE A. WILTZ, Examiner.
M. L. FAIGUS, Assistant Examiner.